US010133758B2

(12) United States Patent
Krishnan et al.

(10) Patent No.: US 10,133,758 B2
(45) Date of Patent: Nov. 20, 2018

(54) CELL-BASED DATABASE MANAGEMENT SYSTEM

(71) Applicant: Boardwalktech, Inc., Palo Alto, CA (US)

(72) Inventors: Ganesh Krishnan, Cupertino, CA (US); Dharmesh Kirit Dadbhawala, San Jose, CA (US); Ashish Baluja, Sunnyvale, CA (US)

(73) Assignee: Boardwalktech, Inc., Cupertino, CA (US)

( * ) Notice: Subject to any disclaimer, the term of this patent is extended or adjusted under 35 U.S.C. 154(b) by 1035 days.

(21) Appl. No.: 14/481,942

(22) Filed: Sep. 10, 2014

(65) Prior Publication Data
US 2016/0070728 A1 Mar. 10, 2016

(51) Int. Cl.
*G06F 17/00* (2006.01)
*G06F 17/30* (2006.01)

(52) U.S. Cl.
CPC .. *G06F 17/30312* (2013.01); *G06F 17/30353* (2013.01)

(58) Field of Classification Search
CPC .............................................. G06F 17/30312
See application file for complete search history.

(56) References Cited

U.S. PATENT DOCUMENTS

| 6,094,649 | A | * | 7/2000 | Bowen | G06F 17/30622 707/711 |
| 6,353,820 | B1 | * | 3/2002 | Edwards | G06F 17/30336 707/696 |
| 7,383,285 | B1 | * | 6/2008 | Pal | G06F 17/30607 |
| 8,291,019 | B1 | * | 10/2012 | Rochelle | H04L 51/00 709/205 |
| 2001/0032214 | A1 | * | 10/2001 | Bauchot | G06F 17/246 715/212 |
| 2013/0007118 | A1 | * | 1/2013 | Rochelle | G06F 17/246 709/203 |
| 2014/0372527 | A1 | * | 12/2014 | Zaveri | H04L 51/046 709/204 |

\* cited by examiner

*Primary Examiner* — Charles E Lu
(74) *Attorney, Agent, or Firm* — Georgiy L. Khayet

(57) ABSTRACT

Provided are systems and methods for managing a database. In an example system, information stored in cells includes a row identifier, a column identifier, a value identifier, and a transaction identifier. The system includes a cell domain and one or more cell buffers. Both the cell domain and cell buffer include a plurality of cells, a row sequence ordering the row identifiers of cells, and a column sequence ordering the column identifiers. Additionally, the cell domain includes row and column identifier generators and transaction and value sequences. The system further includes a transfer module operable to transfer cells from a cell buffer to the cell domain, and a reader module operable to output cells, upon receiving a request buffer, from the cell domain to a response buffer. A set of constraints is applied when outputting cells to the response buffer based on the information stored in the request buffer.

16 Claims, 12 Drawing Sheets

CELL-BASED DATABASE MANAGEMENT SYSTEM

FIELD

The present application relates generally to data processing and, more particularly, to methods and systems for managing databases.

BACKGROUND

Organizing and efficiently managing information is a difficult task, especially when the information comes from different locales and users. For example, a chain store may have stores and employees located all over the world. Therefore, information coming from the stores to the central headquarters may vary in features due to the local specifics. Processing a large variety of information coming from different locales and users, such as, for example, sales reports, budget proposals, and accounting reports, may be both time and resource consuming. Effective management of information should provide users at different locations with access to the information kept in a central database in order to modify, add, or request data.

Another issue associated with management of information is security of data. To maintain security of the data, users from various locations should be allowed to modify or request data kept in a single central database according to their access privileges while different versions and timestamps of the data are maintained by a versioning system.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject.

The present disclosure is related to approaches for managing data in a cell-based database. Specifically, a system for managing a cell-based database may comprise a cell domain, one or more cell buffers, a transfer module, a reader module, and a new sequence identifier generation module.

The cell domain may comprise a plurality of cells, wherein each cell may include a row identifier, a column identifier, a transaction identifier, and a value identifier, and wherein the transaction identifier includes a user identifier and a time identifier. The cell domain may further include a row sequence and a column sequence. The row identifiers of cells may be ordered using the row sequence, and the column identifiers of cells may be ordered using the column sequence. The cell domain may further include a transaction sequence comprising the transaction identifiers of all cells and a value sequence comprising the value identifiers of all cells. The cell domain may further include a row identifier generator and a column identifier generator. The row identifier generator may provide an unordered set of unique row identifiers, while the column identifier generator may provide an unordered set of unique column identifiers. Fields of cells from the plurality of cells of the cell domain are defined.

The cell buffer from the one or more cell buffers may include a plurality of cells, with the cells having structure of the cells of the cell domain. The cell buffer may include a buffer row sequence and buffer column sequence, which may be different from the row sequence and column sequence of the cell domain. The buffer row sequence can order the row identifiers of the cells of the cell buffer while the buffer column sequence can order the column identifiers of the cells of the cell buffer. The cells from the cell domain can have undefined identifiers.

The transfer module of the system for managing a cell-based database is operable to transfer cells from a cell buffer to the cell domain. The sequence identifier generation module is operable to generate a new sequence identifier in the row sequence of the cell domain or the column sequence of the cell domain. The reader module is operable to receive a request buffer, with the request buffer being one of the cell buffers. The reader module is further operable to output cells from the cell domain to a response buffer, with the response buffer being another cell buffer. Outputting of the cells can be based on the information stored in cells of the request buffer and further based on specific constraints.

According to an approach of the present disclosure, a method for managing a cell-based database may comprise transferring cells from the cell buffer to the cell domain. While in transfer, the cells from the cell buffer can be transformed in order to define missing identifiers of the cells (e.g., a row identifier, a column identifier, and a transaction identifier) and added to the cell domain. While transferring the cells, a new sequence identifier can be generated in either the row sequence or the column sequence of the cell domain.

The method for managing a cell-based database may also comprise receiving a response buffer and outputting the response buffer, wherein the response buffer comprises cells of the cell domain that satisfy reading constraints based on the information stored in the cells of the request buffer.

In further example embodiments of the present disclosure, the method steps are stored on a machine-readable medium comprising instructions, which when implemented by one or more processors perform the recited steps. Other features, examples, and embodiments are described below.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

The technology described herein is directed to database management. Embodiments of the described technology may be practiced with a computer, a computer cluster, a server, a cloud computing system, and so forth.

According to an example embodiment, a method for managing a cell-based database may comprise transferring cells from a cell buffer to a cell domain. A transfer of the cells may comprise reading the cells from the cell buffer, transforming the cells, and adding the cells from the cell buffer to the cell domain. The method may also include receiving a request buffer and outputting a response buffer, wherein the response buffer and request buffer are cell buffers.

Figure 1:
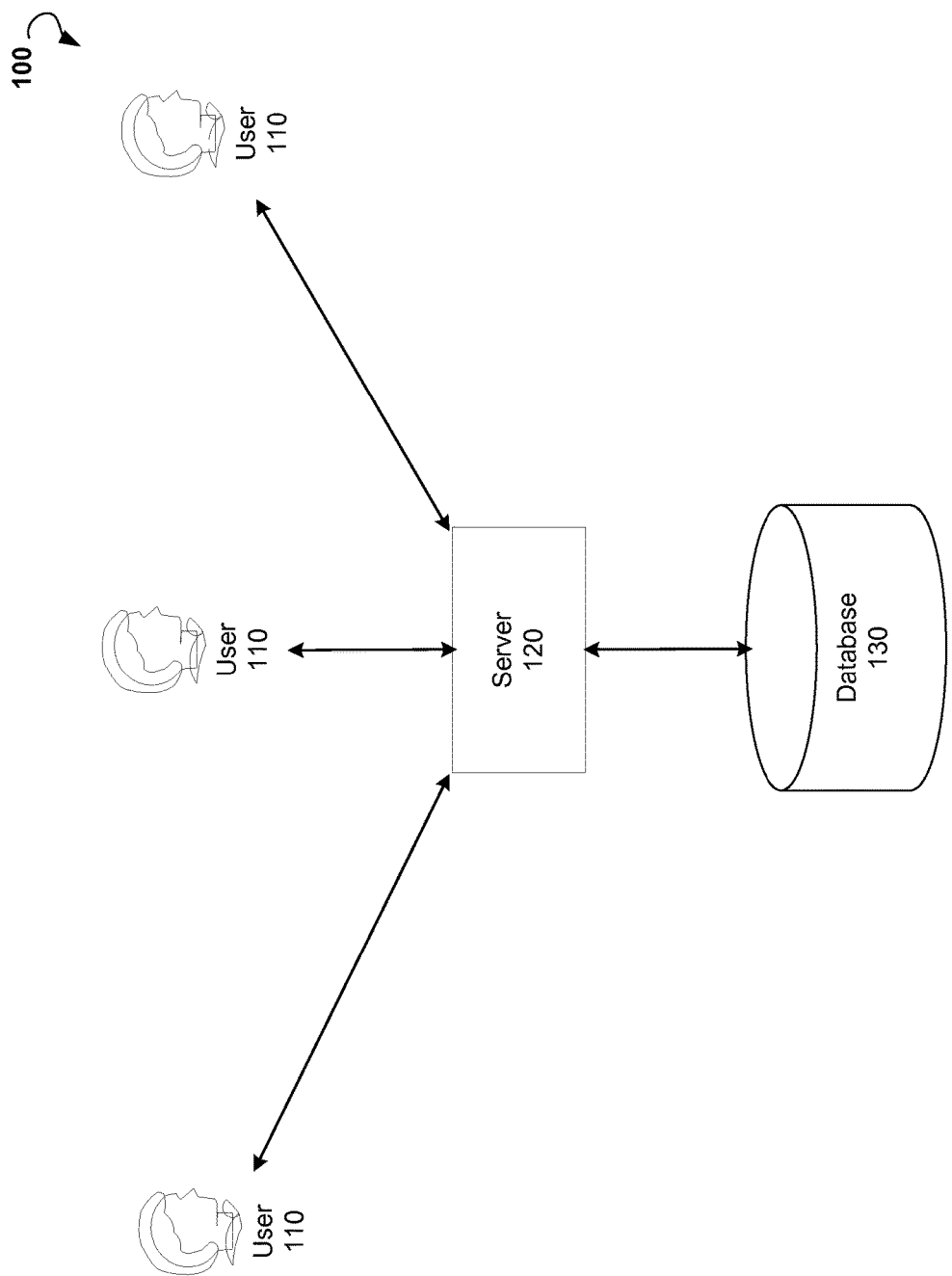
FIG. 1 illustrates an example environment in which the technology of the present disclosure can be practiced.

Referring now to FIG. 1 of the drawings, an environment 100 is shown in which the cell-based database technology described herein can be practiced. In example environment 100, one or more users 110 may access a server 120. The server 120 may be connected to a database 130 or, alternatively, the database 130 may be stored in a memory associated with server 120.

The one or more users 110 can request and modify the information stored in the database 130 via server 120. The server 120 can include a J2EE server, a .NET server, and so forth. The one or more users 110 may connect to server 120 using a computer or a mobile network (for example the Internet, a LAN, and others).

In an example embodiment, the information stored in database 130 may include business data, such as, for example, sale figures of sales departments of a chain store. The one or more users 110 can include sales representatives of the chain store accessing the database 120 from different geographic locations.

Figure 2:
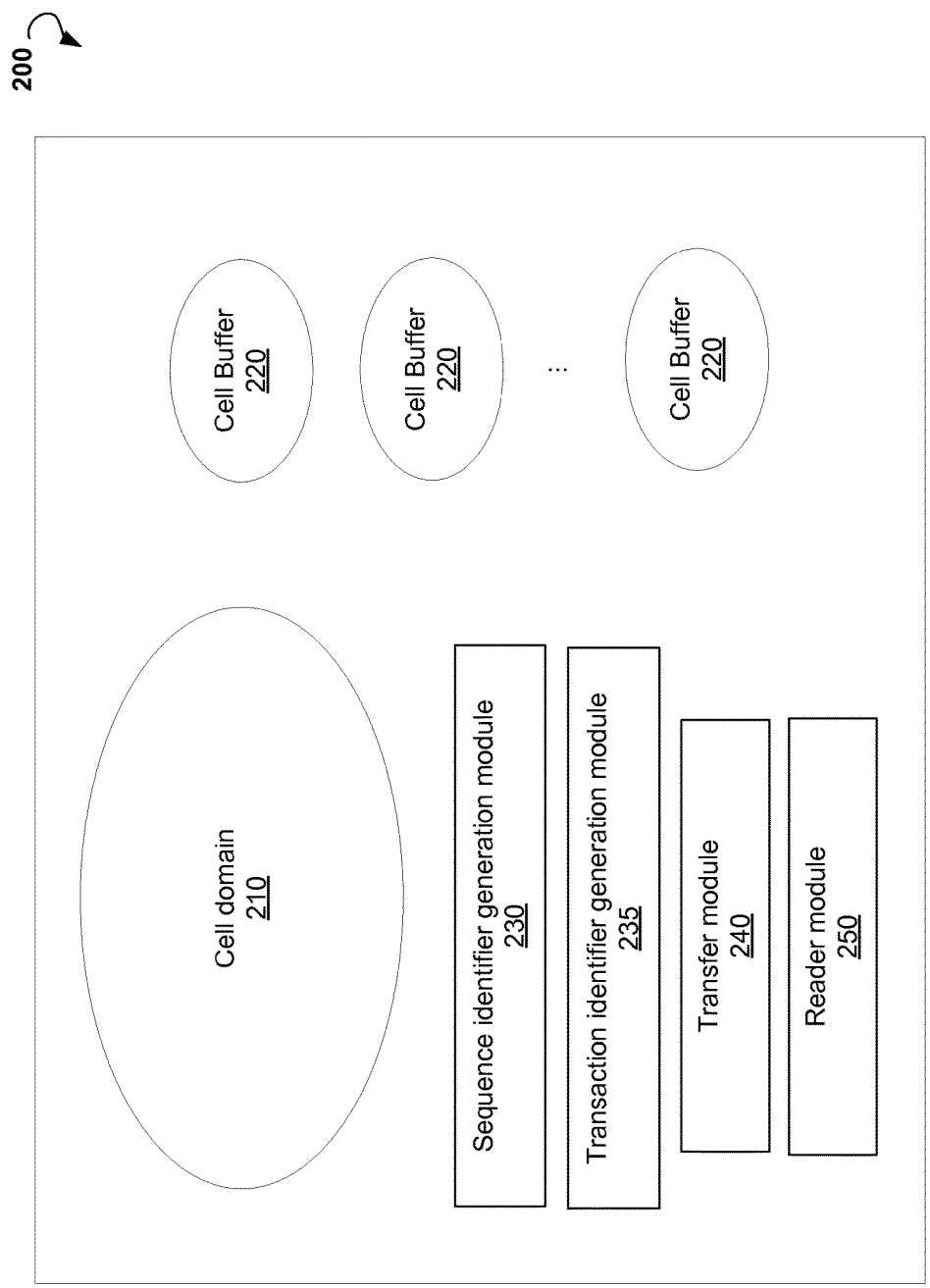
FIG. 2 is a block diagram showing an example system for managing a cell-based database.

FIG. 2 is a block diagram showing main components of an example system 200 for managing a cell-based database. The example system 200 can include a cell domain 210, one or more cell buffers 220, a new sequence identifier generation module 230, a transaction identifier generation module 235, a transfer module 240, and a reader module 250.

Figure 3:
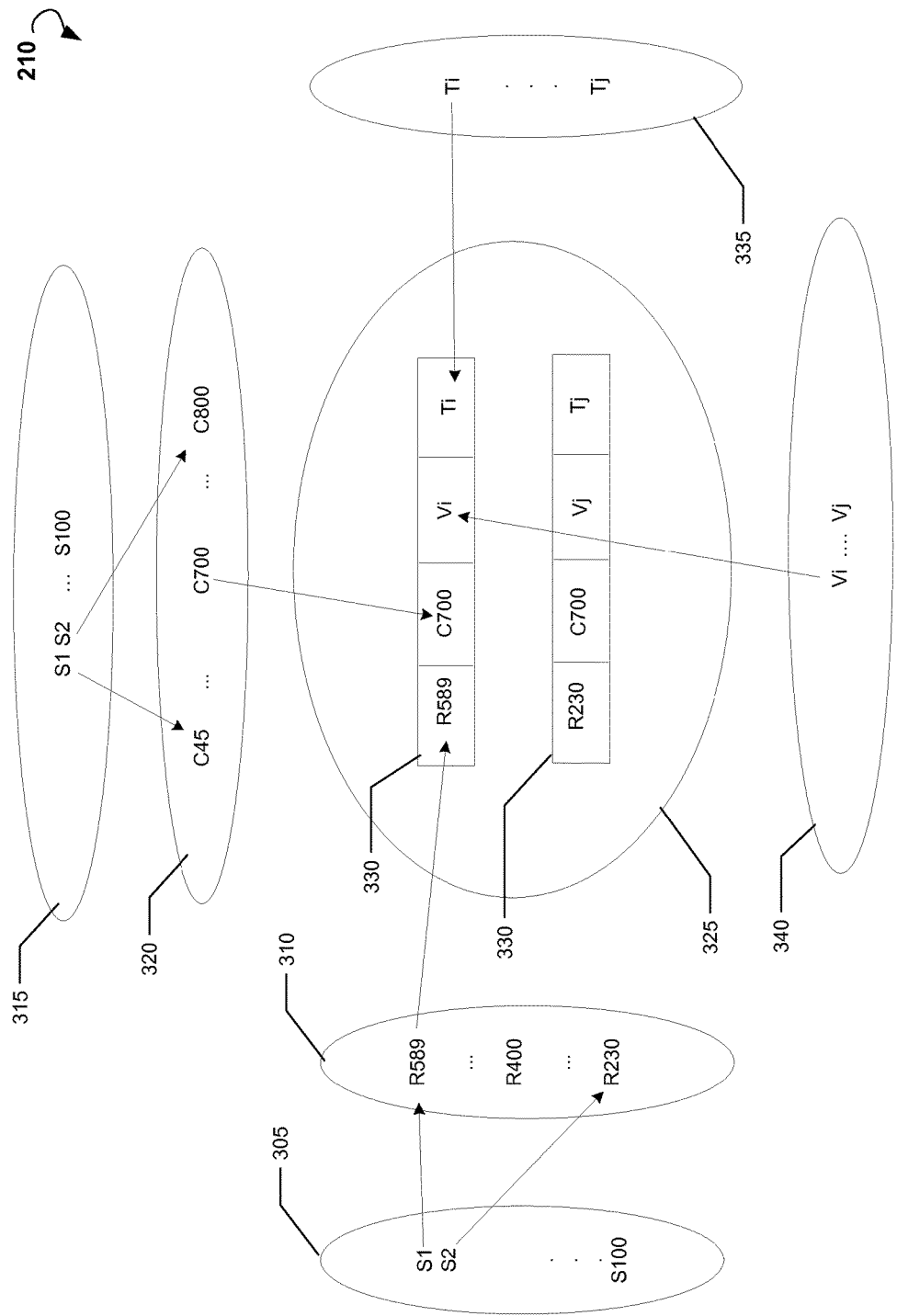
FIG. 3 is a block diagram showing components of a cell domain, according to an example embodiment.

FIG. 3 is a block diagram of a cell domain 210 of system 200 for managing a cell-based database. FIG. 3 provides specifics of the cell domain 210 of FIG. 2. According to an example embodiment, the cell domain 210 may comprise a plurality 325 of cells 330. Each cell 330 in the plurality 325 may include a row identifier, a column identifier, a value identifier, and a transaction identifier. The transaction identifier, in turn, may include a user identifier and a time identifier. In some embodiments, the transaction identifier can be generated by the transaction identifier generation module 235 shown in FIG. 2.

The cell domain 210 may further include a row sequence 305 and a column sequence 315. The row sequence 305 may be used to order an unordered set of row identifiers of all cells 330 in the plurality 325. Each element (row sequence identifier) of the row sequence 305 corresponds to one unique row identifier used as a row identifier of a cell from the cell domain. Similarly, the column sequence 315 is used to order an unordered set of the column identifiers of all cells 330 in plurality 325. Each element (column sequence identifier) of the column sequence 315 corresponds to one unique column identifier used as column identifier of cells from the cell domain.

The cell domain 210 may include a row identifier generator 310 and a column identifier generator 320. The row identifier generator 310 includes an unordered set of unique row identifiers, while the column identifier generator 320 includes an unordered set of unique column identifiers.

The cell domain 210 may include a transaction sequence 335. The transaction sequence 335 may include transaction identifiers of the plurality 325 of cells 330. In some embodiments, the cell domain 210 may include a value identifier sequence 340.

It should be noted that cells 330 in cell domain 210 have all fields specified: the row identifier, the column identifier, the value identifier, and the transaction identifier.

Figure 4:
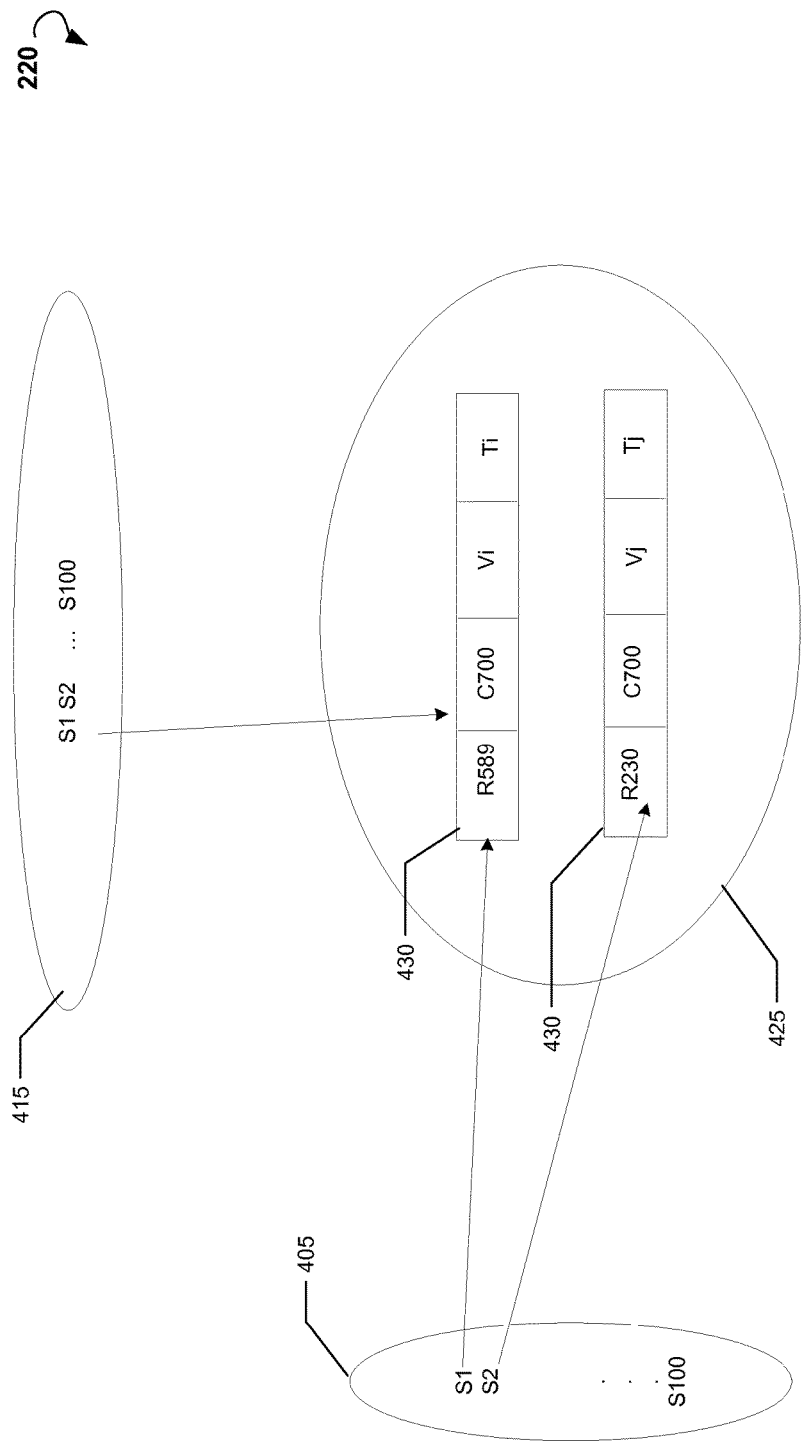
FIG. 4 is a block diagram showing components of a cell buffer, according to an example embodiment.

FIG. 4 is a block diagram of a cell buffer 220 of system 200 for managing a cell-based database. FIG. 4 illustrates specifics of the one or more cell buffers 220 of FIG. 2. According to an example embodiment, the cell buffer 220 may comprise a plurality 425 of cells 430. Each cell 430 in the plurality 425 may include a row identifier, a column identifier, a value identifier, and a transaction identifier. The transaction identifier includes a user identifier and a time identifier.

The cell buffer 210 further includes a buffer row sequence 405 and buffer column sequence 415. Inclusion of the buffer row sequence 405 can be used to order an unordered set of the row identifiers of all cells 430 in the plurality 425. Similarly, the buffer column sequence 415 can be used to order an unordered set of the column identifiers of all cells 430 in plurality 425.

It should be noted that unlike the cell domain 210 shown in FIG. 2 and FIG. 3, the cell buffer 220 does not include a row identifier generator and a column identifier generator. It should also be noted that the buffer row sequence 405 of the cell buffer 220 can be different from the row sequence of the cell domain 210. Similarly, the buffer column sequence 415 of the cell buffer 220 can be different from the column sequence of the cell domain 210.

It should be further noted that cells in plurality 425 of cell buffer 220 can have one or more unspecified fields: the row identifier, the column identifier, a transaction identifier, or a value identifier. In some embodiments, an order of a cell from the cell buffer in the buffer row sequence can be specified or determined even if the row identifier of the cell is not specified. Similarly, an order of a cell from the cell buffer in the buffer column sequence can be specified or determined even if the row identifier of the cell is not specified.

Figure 5:
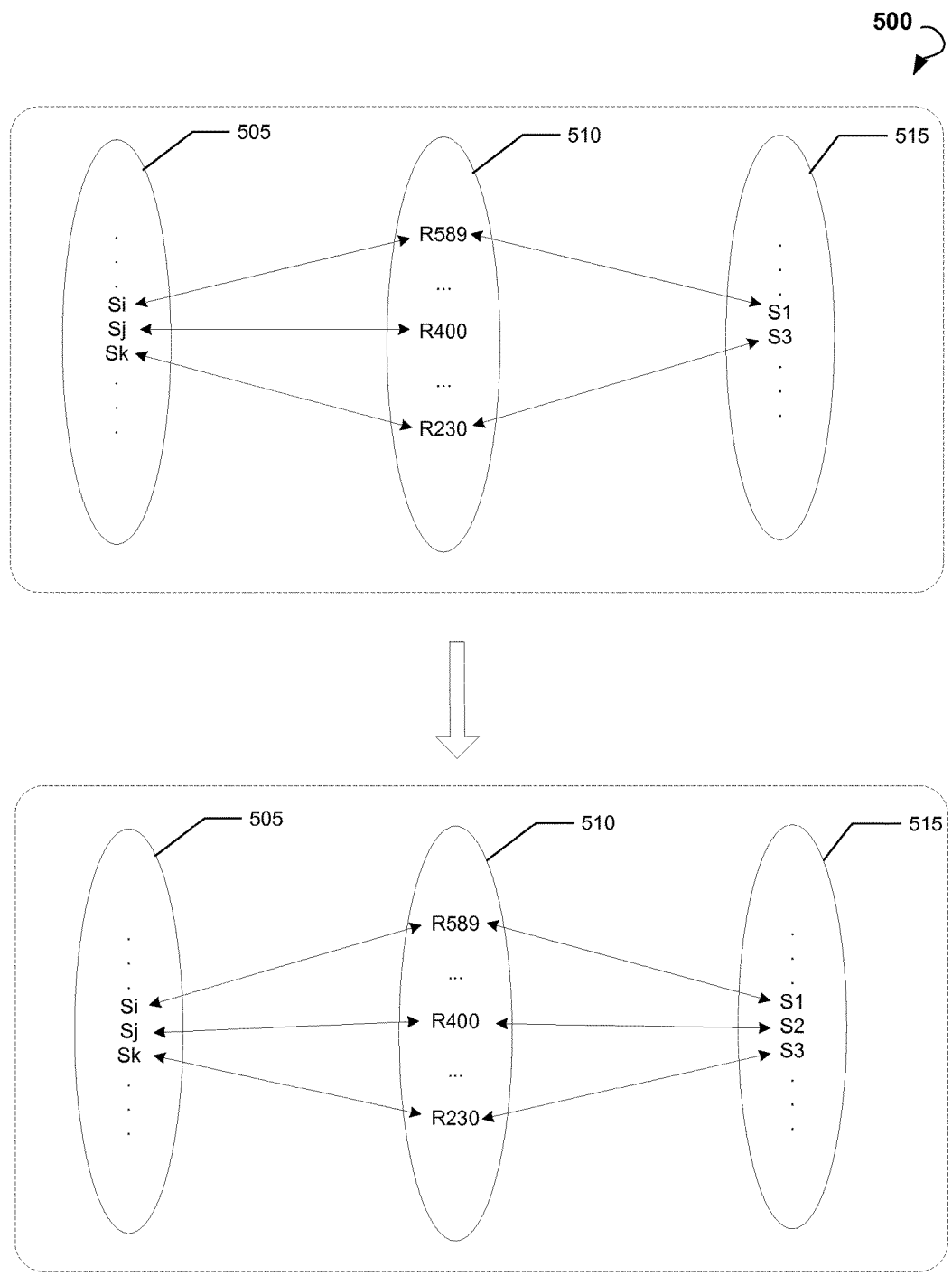
FIG. 5 is a block diagram illustrating generation of a new sequence identifier for a sequence, according to an example embodiment.

FIG. 5 a block diagram illustrating an example 500 of generation of a new sequence identifier for a sequence, according to an example embodiment. The generation of a new sequence identifier can be carried out by the new sequence identifier generation module 230 of a system for managing cell-based database shown in FIG. 2. In example 500, a set 510 is an unordered set of identifiers. The identifiers of the unordered set 510 can be ordered using both a sequence 505 and a sequence 515.

In some example embodiments, the set 510 may correspond to an unordered set of row identifiers of cells from cell buffer 220 (shown in FIG. 4) and sequence 505 may correspond to buffer row sequence 405 of the cell buffer 220 shown in FIG. 4, while sequence 515 corresponds to row sequence 305 of the cell domain 210 shown in FIG. 3. Similarly, the set 510 may correspond to an unordered set of column identifiers of cells of cell buffer 220 (shown in FIG. 4) and sequence 505 corresponds to buffer row sequence 415 of the cell buffer 220 shown in FIG. 4, while sequence 515 corresponds to row sequence 315 of the cell domain 210 shown in FIG. 3.

In example 500, three identifiers R589, R400, and R230 from unordered set 510 are ordered by sequence 505. Three successive sequence identifiers (elements) Si, Sj, Sk of sequence 505 correspond to the identifiers R589, R400, and R230, respectively. The identifiers R589 and R230 of unordered set 510 are also ordered by sequence 515. Two successive sequence identifiers S1 and S3 of the sequence 515 correspond to the identifiers R589 and R230 and there are no sequence identifiers in the sequence 515 that correspond to identifier R400 of the set 510. In other words, the sequence identifier S1 of the sequence 515 is equivalent to sequence identifier Si of the sequence 505 since these identifiers correspond to the same identifier R589. Similarly, the sequence identifier S3 of the sequence 515 is equivalent to the sequence identifier Sk of the sequence 505 since these identifiers are ordering the same identifier R230.

According to a new sequence identifier generation rule, a new sequence identifier S2 is generated in sequence 515 between two successive elements S1 and S3, and the sequence identifier S2 is assigned to correspond to the identifier R400 from the unordered set 510. The generated sequence identifier S2 of the sequence 515 is equivalent to the sequence identifier Sj of the sequence 505 since both of them correspond to the same identifier R400 of the unordered set 510.

Figure 6:
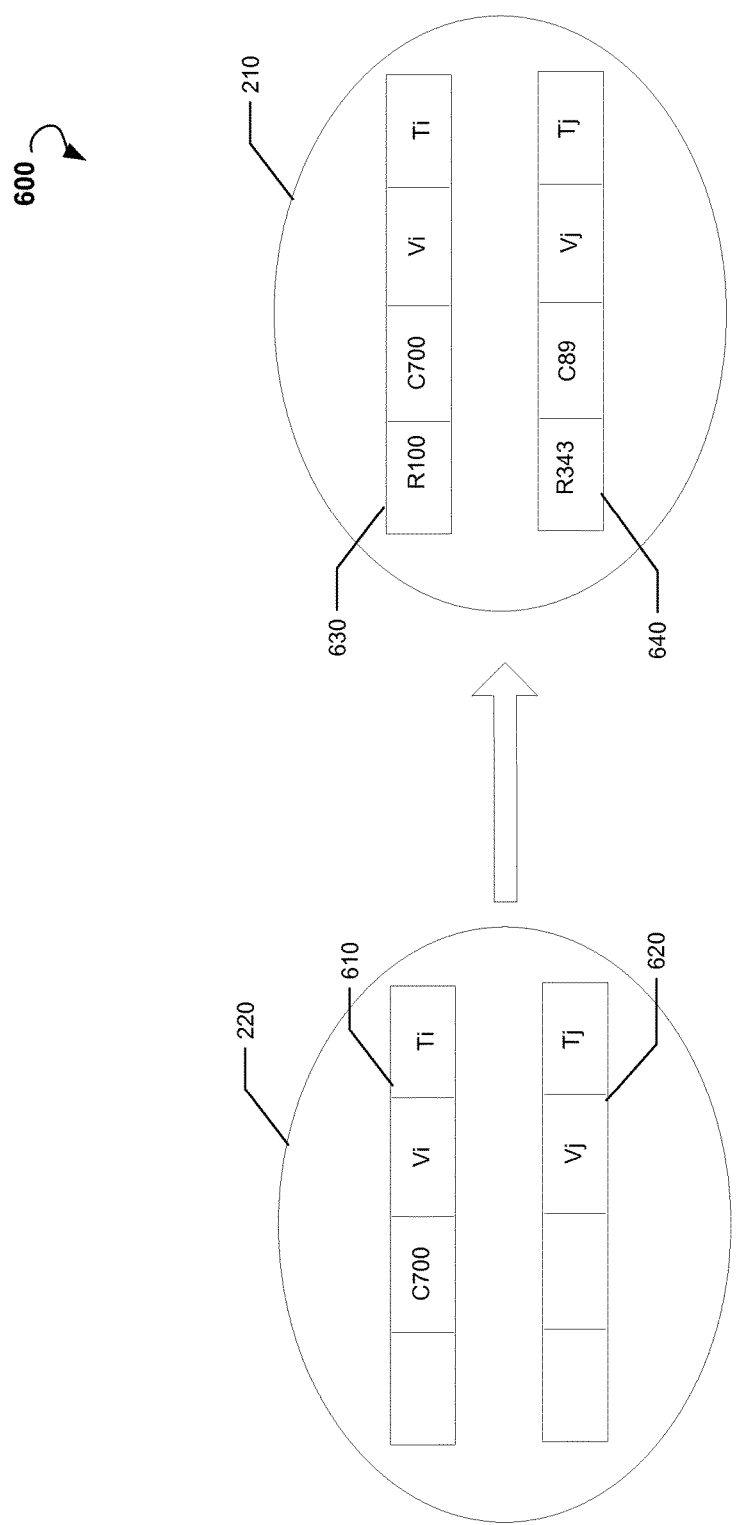
FIG. 6 is a block diagram illustrating a process of transferring cells from a cell buffer to a cell domain, according to an example embodiment.

FIG. 6 is a block diagram illustrating a process 600 of transferring cells from a cell buffer 220 to a cell domain 210, according to an example. The specifics of the cell buffer are shown in FIG. 4, and the specifics of the cell domain are shown in FIG. 3. In example process 600, the cell buffer 220 includes two cells 610 and 620. Both cells 610 and 620 have unspecified fields. Since the cell domain can have only cells with fully specified fields, the cells 610 and 620 are modified to have all fields specified while being transferred to the cell domain. In example process 600, after the transfer, the cells 610 and 620 from the cell buffer 220 correspond to cells 630 and 640 from the cell domain 210. The cells 630 and 640 have fully specified fields.

Figure 7:
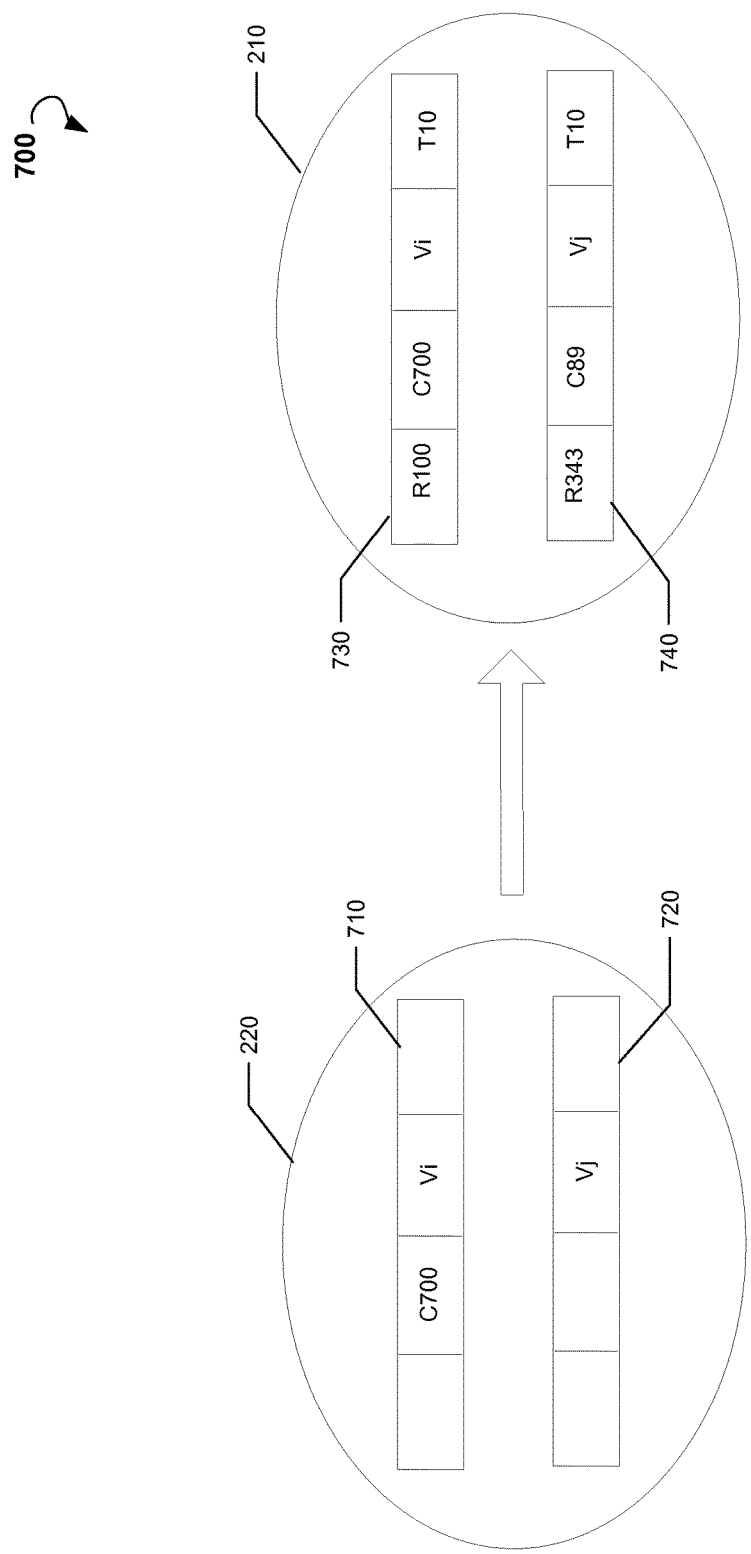
FIG. 7 is a block diagram illustrating another example process of transferring cells from a cell buffer to a cell domain and generating a single transaction identifier for all cells.

FIG. 7 is a block diagram illustrating a process 700 of transferring cells from the cell buffer 220 to the cell domain 210, according to another example. In example process 700, the cell buffer 220 includes two cells 710 and 720. Both cells 710 and 720 have unspecified transaction identifiers. Since the cell domain can only have cells with fully specified fields, the cells 710 and 720 are modified to have all fields specified while being transferred to the cell domain. According to a constraint, a single transaction identifier is assigned to all cells in the cell buffer 220. The single transaction identifier can be generated by the transaction identifier module 235 shown in FIG. 2. In example process 700, after the transfer, the cells 710 and 720 from the cell buffer 220 correspond to cells 730 and 740 from the cell domain 210. The cells 730 and 740 have the same transaction identifier.

Figure 8:
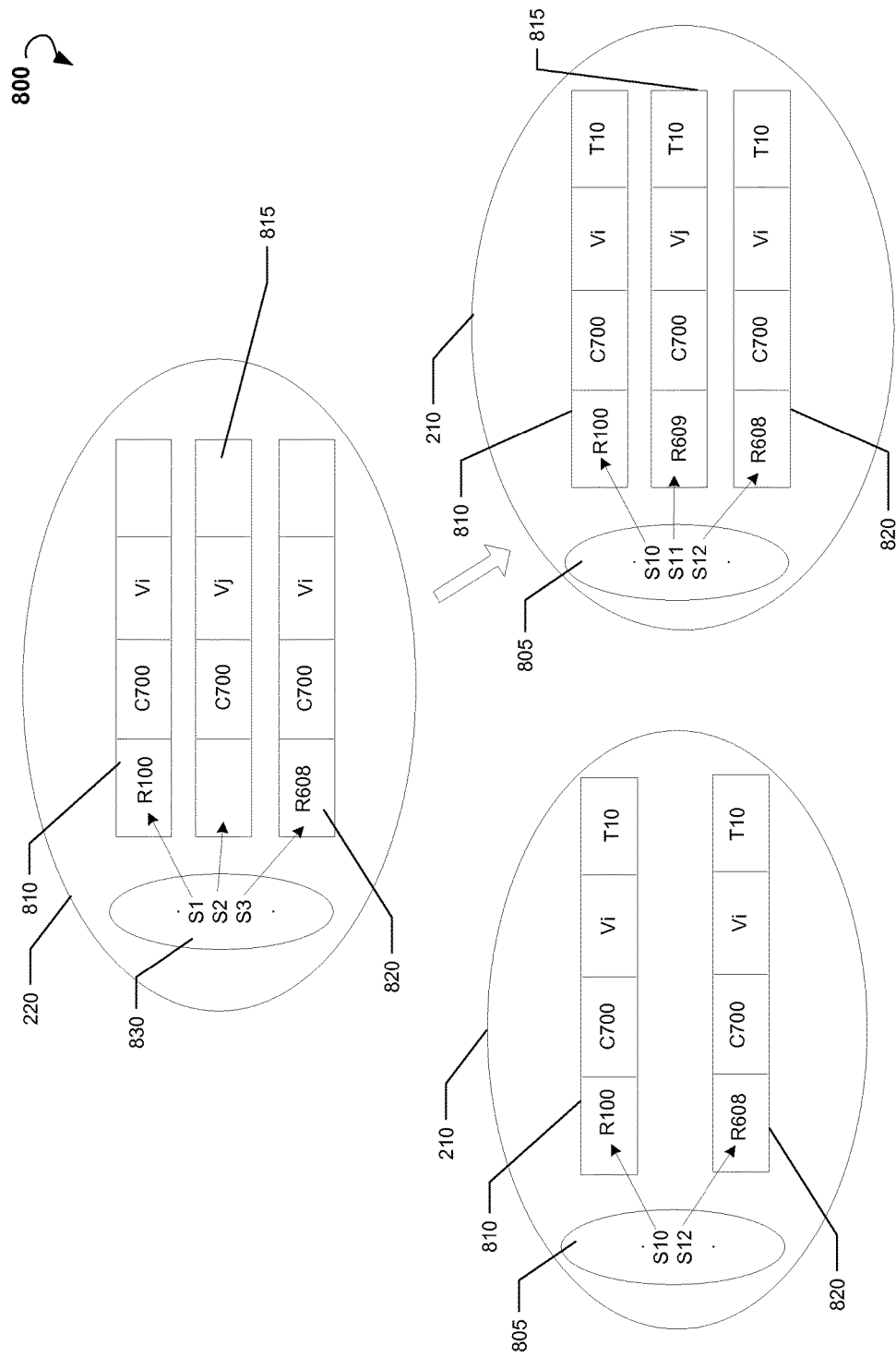
FIG. 8 is block diagram showing yet another example process of transferring cells from a cell buffer to a cell domain and generating a new sequence identifier for a row sequence of the cell domain.

FIG. 8 is a block diagram illustrating a process 800 of transferring cells from a cell buffer 220 to the cell domain 210, according to yet another example. FIG. 8 shows two states of the cell domain 210: a state before the transfer of the cells from the cell buffer 220 is on the left, and a state after the transfer of the cells from the cell buffer 220 is on the right.

Prior to the transfer, the cell domain may already include two cells 810 and 820 with row identifiers R100 and R608. These row identifiers of cells 810 and 820 from the cell domain can be ordered by the row sequence 805 of the cell domain. The cell buffer 220 includes three cells, cells 810 and 820 with row identifiers R100 and R608 and the cell 815 with an undefined row identifier. The cells 810, 815, and 820 are ordered by the buffer row sequence 830. The order of the cell 815 is specified even though the row identifier of the cell is not specified.

When transferring the cells from the cell buffer 220 to cell domain 210, a new row identifier R609 is generated for the cell 815 using the row identifier generator 310 (shown in FIG. 3) of the cell domain 210 and a new sequence identifier corresponding to the new row identifier is generated in the row sequence 805 of the cell domain using the sequence identifier generator module 230 (shown in FIG. 2) and scheme described in FIG. 5. In addition, while transferring the cells from the cell buffer 220 to cell domain 210, a new transaction identifier is generated for the cell 815. A similar scheme for transferring cells from the cell buffer to the cell domain can be used if a cell from the cell domain has not specified a column identifier and the order of the cell in the buffer column sequence is specified or can be determined.

In connection to the examples for transferring cells from the cell buffer to the cell domain shown in FIGS. 6-8, it should be noted that if at least one cell from the cell buffer cannot be transferred to the cell domain, no cells from the cell buffer are transferred to the cell domain. The operation described in FIGS. 6-8 can be carried out by the transfer module 240 of system 200 for managing cell-based database shown in FIG. 2.

Figure 9:
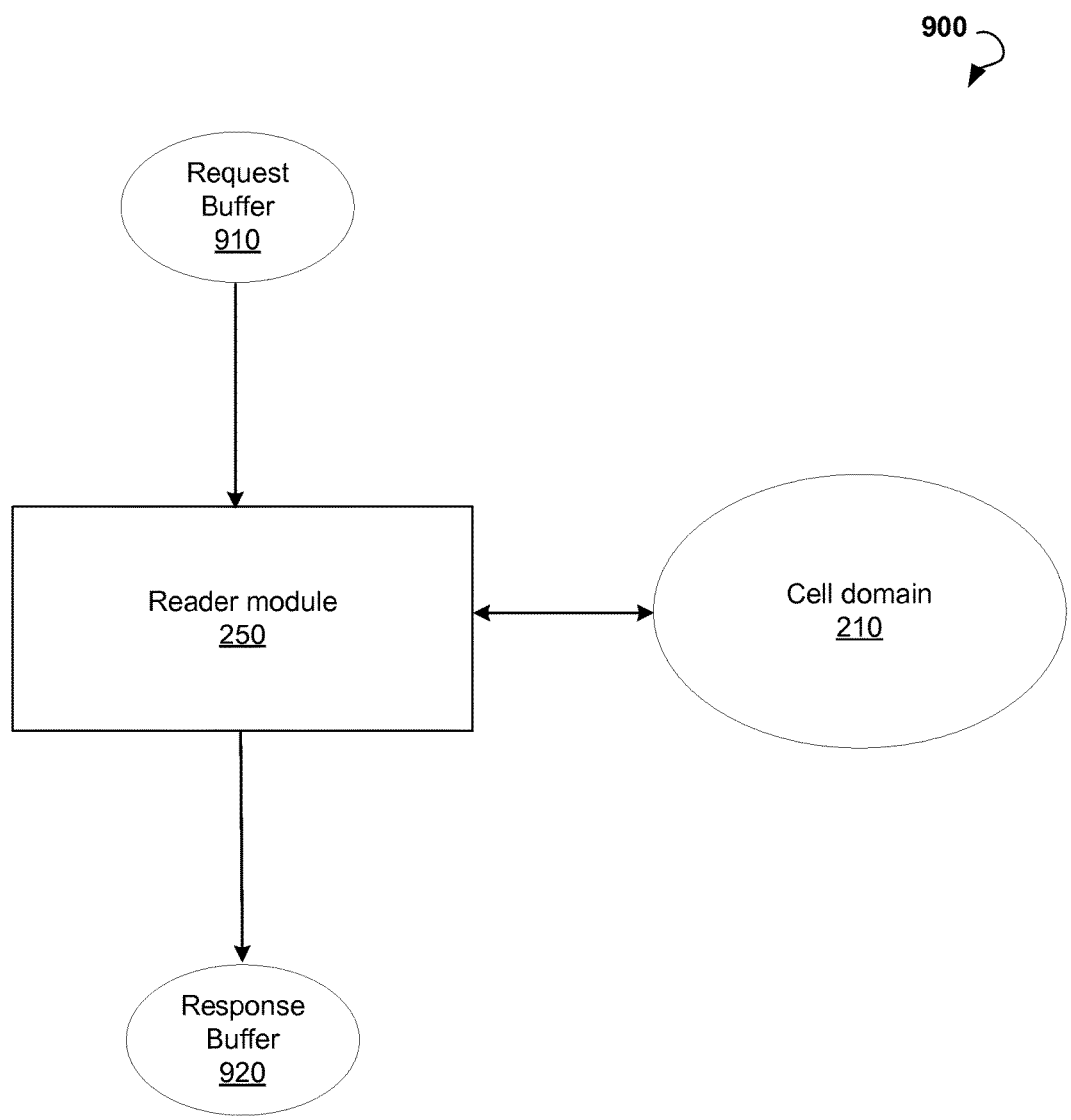
FIG. 9 is a block diagram showing an example process of reading cells from the cell domain, according to an example embodiment.

FIG. 9 is block diagram showing scheme 900 for reading cells from a cell domain, according to an example embodiment. Reading cells from the cell domain can be carried out using the reader module 250 of the system 200 for managing cell-based database (also shown in FIG. 2). The reader module can receive a request buffer 910. The request buffer 910 is a cell buffer from the one or more cell buffers 220 of system 200 shown in FIG. 2. Based on information stored in the cells of the request buffer 910, the reader module 250 is operable to output cells from the cell domain to a response buffer 920. The response buffer 920 is one of the cell buffers 220 of system 200 shown in FIG. 2.

Cells of the request buffer 910 include at least one of the following: row identifier, column identifier, or transaction identifier. In all cells of the response buffer 920 all fields, and, namely, the row identifier, column identifier, transaction identifier, and value identifier are specified.

Reading cells from the cell domain is subject to several constraints. According to the first constraint, if a single transaction identifier is defined for all cells in the request buffer 910. The response buffer 920 includes cells from the cell domain 210, wherein the maximum of transaction identifiers associated with the cells for the cell domain 210 does not exceed the single transaction identifier of the cells in request buffer 910 and does not include the cells from the cell buffer. Additionally, the minimum of transaction identifiers associated with the cells for the cell domain 210 exceeds the single transaction identifier of the cells in the request buffer. By applying the first constraint to request buffer 910, a history of cells before the certain time can be obtained.

According to a second constraint, if a single transaction identifier is defined for all cells in the request buffer 910, then the response buffer 920 includes cells from the cell domain 210, maximum of transaction identifiers associated with the cells from the cell domain 210 is equal or greater than the single transaction identifier of the cells in request buffer 910 and does not include the cells from the cell buffer. Additionally, the maximum of transaction identifiers associated with the cells in the cell domain 210 does not exceed the single transaction identifier of the cells in request buffer.

According to a third constraint, if the cell buffer includes at least two cells, a first cell and a second cell, and the transaction identifier of the first cell is less than the transaction identifier of the second cell, then the response buffer includes only cells from the cell domain, the transaction identifier of which is larger than the transaction identifier of the first cell from the request buffer, and does not exceed the transaction identifier of the second cell from the request buffer.

According to the fourth constraint, if the request buffer 910 includes a cell with a defined row identifier, then the column identifiers of cells in the response buffer 920 are ordered by column sequence of the cell domain 210.

According to the fifth constraint, if the request buffer 910 includes a cell with a defined column identifier, then the row identifiers of cells in the response buffer 920 are ordered by row sequence of the cell domain 210.

According to the sixth constraint, if the request buffer 910 includes a cell with a defined value identifier, then the row identifiers of cells in the response buffer 920 are ordered by row sequence of the cell domain 210, and the column identifiers of cells in the response buffer 920 are ordered by column sequence of the cell domain 210.

It should be appreciated by those skilled in the art that any of the above mentioned constraints can be applied and some of the constraints can be combined.

Figure 10:
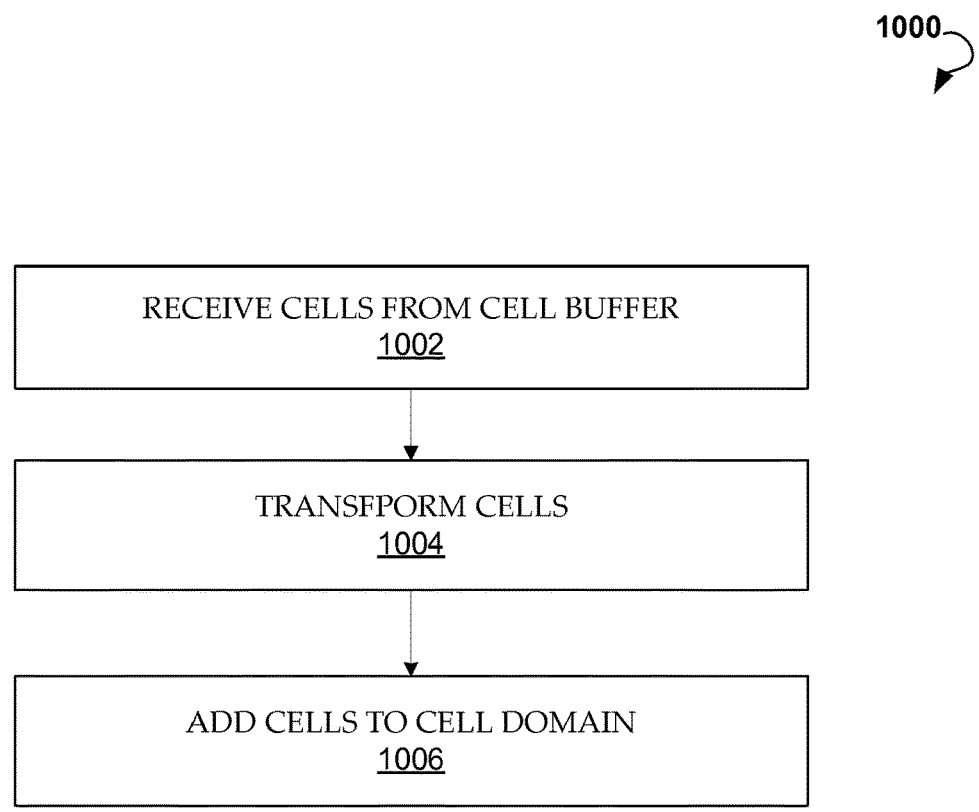
FIG. 10 and FIG. 11 are process flow diagrams showing methods for managing cell-based databases, according to some example embodiments.

FIG. 10 is a process flow diagram showing a method 1000 for managing a cell-based database, according to an example embodiment. The steps of the example method 1000 can be executed by transfer module 240 of the system 200 for managing cell-based database. The example method 1000 may commence at step 1002 with receiving cells from a cell buffer. The cell buffer is one of the cell buffers 220 shown in FIG. 2. At step 1004, the received cells are transformed. Details of transforming cells are provided in the descriptions of FIGS. 6-8. For example, a single transaction identifier can be specified for all the cells, the row identifier of one or more cell can be specified if undefined, or a column identifier of one or more cell can be specified if missing. In step 1006, the transformed cells are added to the cell domain.

Figure 11:
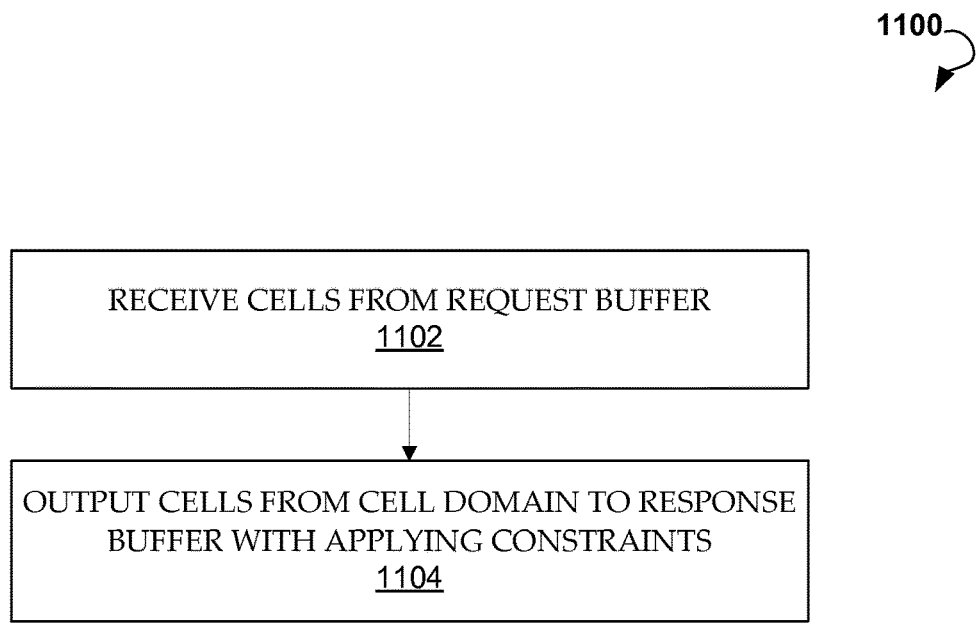

FIG. 11 is a process flow diagram showing a method 1100 for managing a cell-based database, according to another example embodiment. The steps of the example method 1100 can be executed by reader module 250 of the system 200 for managing cell-based database. The example method 1100 may commence at step 1102 with receiving cells from a request buffer. The request buffer is one of the cell buffers 220 shown in FIG. 2. In step 1104, the cells from the cell domain are outputted to the response buffer with applying constraints. The response buffer is one of cell buffers 220 shown in FIG. 2. The details of constraints applied while outputting cells to the response buffer are provided in description of FIG. 9.

Figure 12:
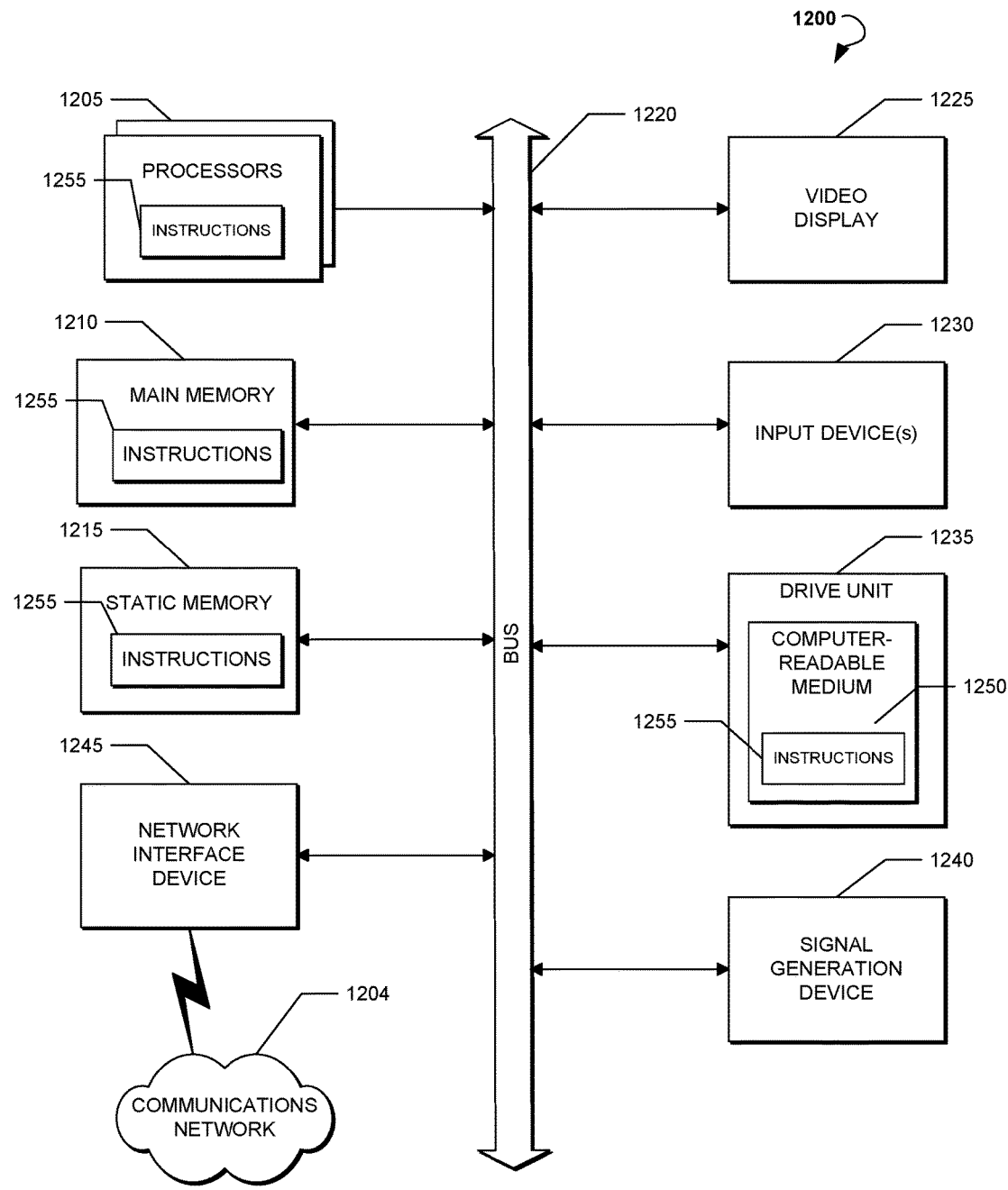
FIG. 12 is a block diagram showing an example computer system wherein the disclosed technology can be implemented.

FIG. 12 shows a diagrammatic representation of a computing device for a machine in the example electronic form of a computer system 1200, within which a set of instructions for causing the machine to perform any one or more of the methodologies discussed herein can be executed. In various example embodiments, the machine operates as a standalone device or can be connected (e.g., networked) to other machines. In a networked deployment, the machine can operate in the capacity of a server or a client machine in a server-client network environment, cloud computing environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein.

The example computer system 1200 includes a processor or multiple processors 1205 (e.g., a central processing unit (CPU), a graphics processing unit (GPU), or both), and a main memory 1210 and a static memory 1215, which communicate with each other via a bus 1220. The computer system 1200 can further include a video display unit 1225 (e.g., a liquid crystal display (LCD) or a cathode ray tube (CRT)). The computer system 1200 also includes at least one input device 1230, such as an alphanumeric input device (e.g., a keyboard), a cursor control device (e.g., a mouse), a microphone, a digital camera, a video camera, and so forth. The computer system 1200 also includes a disk drive unit 1235, a signal generation device 1240 (e.g., a speaker), and a network interface device 1245.

The disk drive unit 1235 includes a computer-readable medium 1250, which stores one or more sets of instructions and data structures (e.g., instructions 1255) embodying or utilized by any one or more of the methodologies or functions described herein. The instructions 1255 can also reside, completely or at least partially, within the main memory 1210 and/or within the processors 1205 during execution thereof by the computer system 1200. The main memory 1210 and the processors 1205 also constitute machine-readable media.

The instructions 1255 can further be transmitted or received over the network 104 via the network interface device 1245 utilizing any one of a number of well-known transfer protocols (e.g., Hyper Text Transfer Protocol (HTTP), CAN, Serial, and Modbus).

While the computer-readable medium 1250 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks (DVDs), random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, methods and systems for managing a cell-based database have been disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for managing a database, the system comprising:
    a server including at least on processor and a memory storing processor-executable codes, the server configured to:
    maintain a cell-based database, the cell-based database comprising: a cell domain, the cell domain comprising:
    a plurality of cells, each cell of the plurality of cells comprising:
        a row identifier;
        a column identifier;
        a transaction identifier; and
        a value identifier;
    a domain row sequence, the domain row sequence independently ordering the row identifiers of the plurality of cells;
    a domain column sequence, the domain column sequence independently ordering the column identifiers of the plurality of cells;
    a row identifier generator, the row identifier generator including an unordered set of unique row identifiers;
    a column identifier generator, the column identifier generator including an unordered set of unique column identifiers; and
    a transaction sequence, the transaction sequence comprising transaction identifiers of the plurality of cells; and
    to transfer cells from a cell buffer of one or more cell buffers to the cell domain, the one or more cell buffers comprising:
        a plurality of buffer cells, each buffer cell of the plurality of buffer cells comprising:
            the row identifier;
            the column identifier;
            the transaction identifier; and
            the value identifier;
        a buffer row sequence, the buffer row sequence independently ordering the row identifiers of the plurality of buffer cells, the buffer now sequence being different from the domain row sequence; and
        a buffer column sequence, the buffer column sequence independently ordering the column identifiers of the plurality of buffer cells, the buffer column sequence being different from the domain column sequence;
    and wherein while transferring the cells from the cell buffer to the cell domain, the server is further configured to:
        determine that at least one of the row identifier, the column identifier, and the transaction identifier is unspecified in at least one cell from the cell buffer;
        in response to the determination, transform the at least one cell by specifying the at least one of the row identifier, the column identifier, and the transaction identifier;
        determine that a row identifier in at least one cell of the cell buffer is ordered by the buffer row sequence and not ordered by the domain row sequence;
        determine, based on the buffer row sequence, a predecessor of the row identifier and a successor of the row identifier, the predecessor being ordered by the domain row sequence using a first row sequence identifier and the successor being ordered by the domain row sequence using a second row sequence identifier;
        generate a third row sequence identifier;
        add the third row sequence identifier in the domain row sequence between the first row sequence identifier and the second row sequence identifier; and
        order the row identifier by the domain row sequence using the third row sequence identifier.

2. The system of claim 1,
    wherein while transferring the cells from the cell buffer to the cell domain, the server is further configured to:
        determine that a column identifier in at least one cell of the cell buffer is ordered by the buffer column sequence and not ordered by the domain column sequence;
        determine, based on the buffer column sequence, a column predecessor of the column identifier and a column successor of the column identifier, the column predecessor being ordered by the domain column sequence using a first column sequence identifier and the column successor being ordered by the domain column sequence using a second column sequence identifier;
        generate a third column sequence identifier;
        add the third column sequence identifier in the domain column sequence between the first column sequence identifier and the second column sequence identifier; and
    order the column identifier by the domain column sequence using the third column sequence identifier.

3. The system of claim 2, wherein the server is further configured to:
    generate a number comprising at least a time stamp and a user identifier; and
    assign the number to the transaction identifier of a cell from the plurality of cells of the cell domain.

4. The system of claim 3, wherein while transferring the cells from the cell buffer to the cell domain, a single transaction identifier is generated for all cells from the cell buffer.

5. The system of claim 3, wherein while transferring cells from the cell buffer to the cell domain, the cells from the cell buffer are added to the cell domain.

6. The system of claim 3, wherein while transferring cells from the cell buffer to the cell domain, for any cell from the cell buffer for which the row identifier unspecified and an order of the cell in the buffer row sequence of the cell buffer is specified, a new row identifier is generated.

7. The system of claim 3, wherein while transferring cells from the cell buffer to the cell domain, for any cell from the cell buffer for which the column identifier is not specified and an order of the cell in the buffer column sequence is specified, a new column identifier is generated.

8. The system of claim 3, wherein while transferring cells from the cell buffer to the cell domain, if at least one of the cells from the cell buffer cannot be transferred to the cell domain then all of the cells from the cell buffer are not transferred to the cell domain.

9. The system of claim 3, wherein the server is further configured to:
receive a request buffer, the request buffer including a cell buffer from the one or more cell buffers; and
output a response buffer, the response buffer including a cell buffer from the one or more cell buffers.

10. The system of claim 9, wherein:
cells in the request buffer include at least one of the following: a row identifier, a column identifier, and a transaction identifier; and
cells in the response buffer include all of the following: a row identifier, a column identifier, a transaction identifier, and a value identifier.

11. The system of claim 9, wherein:
cells in the request buffer include a transaction identifier;
the response buffer comprises cells from the cell domain, wherein a maximum of transaction identifiers for the cells does not exceed the transaction identifier of the cells in the request buffer;
a minimum of transaction identifiers of cells, the cells being associated with a cell domain and not being associated with the response buffer, exceeds the transaction identifier of cells in the request buffer;
the column identifiers of the cells in the response buffer are ordered with the buffer column sequence of the cell buffer; and
the row identifiers of the cells in the response buffer are ordered with the buffer row sequence of the cell buffer.

12. The system of claim 9, wherein:
the request buffer comprises at least a first cell and a second cell, the transaction identifier of the first cell being less than a transaction identifier of the second cell; and
the response buffer comprises all cells from the cell domain, wherein a transaction identifier of the cells is between the transaction identifier of the first cell and the transaction identifier of the second cell.

13. The system of claim 9, wherein:
at least one cell in the request buffer has a specified row identifier; and
the column identifiers of the cells in the response buffer are ordered with the buffer column sequence of the cell buffer.

14. The system of claim 9, wherein:
at least one cell in the request buffer has a column identifier specified; and
the row identifiers of the cells in the response buffer are ordered with the buffer row sequence of the cell buffer.

15. The system of claim 9, wherein:
at least one cell in the request buffer has a value identifier specified;
the row identifiers of the cells in the response buffer are ordered with the buffer row sequence of the cell buffer; and
the column identifiers of the cells from the response buffer are ordered by the buffer column sequence of the cell buffer.

16. A non-transitory computer-readable storage medium having embodied thereon a program, the program being executable by a processor to perform a method for managing a database, the method comprising:
transferring cells from a cell buffer of one or more cell buffers to a cell-based database, the cell-based database comprising a cell domain;
receiving a request buffer, the request buffer including a cell buffer from the one or more cell buffers; and
outputting a response buffer, the response buffer including a cell buffer from the one or more cell buffers; and
wherein
the cell domain comprises:
a plurality of cells, each cell of the plurality of cells comprising:
a row identifier;
a column identifier;
a transaction identifier, the transaction identifier comprising a time identifier and a user identifier; and
a value identifier;
a domain row sequence, the domain row sequence independently ordering the row identifiers of the plurality of cells;
a domain column sequence, the domain column sequence independently ordering the column identifiers of the plurality of cells;
a row identifier generator, the row identifier generator including an unordered set of unique row identifiers;
a column identifier generator, the column identifier generator including an unordered set of unique column identifiers; and
a transaction sequence, the transaction sequence comprising transaction identifiers of the plurality of cells; and
the one or more cell buffers comprise:
a plurality of buffer cells, each buffer cell of the plurality of buffer cells comprising:
the row identifier;
the column identifier;
the transaction identifier, the transaction identifier comprising a buffer time identifier and the buffer user identifier; and
the value identifier;
a buffer row sequence, the buffer row sequence independently ordering the row identifiers of the plurality of buffer cells, the buffer row sequence being different from the domain row sequence; and
a buffer column sequence, the buffer column sequence independently ordering the column identifiers of the plurality of buffer cells, the buffer column sequence being different from the domain column sequence;
and wherein the transferring includes:
determining that at least one of the row identifier, the column identifier, and the transaction identifier is unspecified in at least one cell from the cell buffer;
in response to the determination, transforming the at least one cell by specifying the at least one of the row identifier, the column identifier, and the transaction identifier;
determining that a row identifier in at least one cell of the cell buffer is ordered by the buffer row sequence and not ordered by the domain row sequence;
determining, based on the buffer row sequence, a predecessor of the row identifier and a successor of the row identifier, the predecessor being ordered by the domain row sequence using a first row sequence identifier and the successor being ordered by the domain row sequence using a second row sequence identifier;

generating a third row sequence identifier;

adding the third row sequence identifier in the domain row sequence between the first row sequence identifier and the second row sequence identifier;

ordering the row identifier by the domain row sequence using the third row sequence identifier;

determining, that a column identifier in at least one cell of the cell buffer is ordered by the buffer column sequence and not ordered by the domain column sequence;

determining, based on the buffer column sequence, a column predecessor of the column identifier and a column successor of the column identifier, the column predecessor being ordered by the domain column sequence using a first column sequence identifier and the column successor being ordered by the domain column sequence using a second column sequence identifier;

generating a third column sequence identifier;

adding the third column sequence identifier in the domain column sequence between the first column sequence identifier and the second column sequence identifier; and ordering the column identifier by the domain column sequence using the third column sequence identifier.

* * * * *